US008526592B2

(12) United States Patent
Paiement et al.

(10) Patent No.: US 8,526,592 B2
(45) Date of Patent: Sep. 3, 2013

(54) SIP REFER EXTENSIONS

(75) Inventors: Timothy David Paiement, Colorado Springs, CO (US); Tan Nguyen, Colorado Springs, CO (US); Suresh Anaparti, Pedagantyada (IN); Dong H. Lee, Allen, TX (US); Todd Eugene Goepferd, Rogers, MN (US); Vahiuddin Syed Khaja, Warangal (IN); Saber Rajmohammed, Old Bowenpally (IN); Sathish Kumar Chevuru, Nellore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 144 days.

(21) Appl. No.: 13/175,444

(22) Filed: Jul. 1, 2011

(65) Prior Publication Data

US 2013/0003956 A1 Jan. 3, 2013

(51) Int. Cl.
*H04M 3/42* (2006.01)

(52) U.S. Cl.
USPC ................. 379/211.01; 370/259; 370/352

(58) Field of Classification Search
USPC .......................... 379/211.01; 370/259, 352
See application file for complete search history.

(56) References Cited

U.S. PATENT DOCUMENTS

| 2005/0221809 | A1* | 10/2005 | Lin | 455/418 |
| 2012/0063366 | A1* | 3/2012 | Long | 370/259 |

* cited by examiner

*Primary Examiner* — Quynh Nguyen (57) ABSTRACT

A system may include a call controller configured to receive a refer message configured to transfer a first endpoint of a call session, the call session being between at least the first endpoint at a first communications device and a second endpoint at a second communications device, the refer message indicating to transfer the first endpoint from the first communications device to a third communications device. The call control may be further configured to subscribe the first communications device to notification messages associated with the referral of the transferred call session, the subscription to the referral extending beyond the call transfer until termination of the call; and send, through the subscription to the first communications device, a notification message indicating termination of the transferred call.

17 Claims, 9 Drawing Sheets

SIP REFER EXTENSIONS

BACKGROUND

Session Initiation Protocol (SIP) is a signaling and call setup protocol defined by the Internet Engineering Task Force (IETF) as Request for Comments (RFC) standard 3261. The SIP protocol is text-based and draws certain design elements from hypertext transfer protocol (HTTP), including encoding rules and status codes. SIP is often used as the signaling protocol for the setup and control of SIP communication sessions. As an example, SIP signaling may be used to establish and control signaling for a simple two-way calling session over Voice over IP (VoIP). As another example, SIP signaling may also be used to control signaling for a multi-party multimedia conference session including multiple media streams.

The SIP protocol may be extended in various ways. One such extension is the SIP REFER method defined in RFC 3515, which provides an extension allowing parties to a session to "refer" recipients to a resource referenced in a SIP REFER request. To allow for the referrer to be notified of the status of the transfer, the SIP REFER method implicitly creates a subscription back to the referrer for the status of a REFER request, without requiring an explicit SIP SUBSCRIBE message. Because the implicit subscription relates to the SIP REFER method, once the referral is complete, the implicit subscription likewise ends.

DETAILED DESCRIPTION

The SIP REFER method may be used to implement call transfer functionality, such as transferring a call between call center agents. An exemplary call transfer situation may be initiated when a customer dials a technical support number for a retail store to resolve an issue with a recent purchase. The call first enters the network of a service provider. From the service provider, the call is forwarded to the retail store. During the support call, it becomes clear to the retail store that the customer's issue can better be handled by the manufacturer of the purchased item. The retail store accordingly transfers the call to the manufacturer. To facilitate billing, the retail store desires information regarding when the transferred call ends, not merely until the call was transferred.

Other exemplary call transfer situations may be initiated when a reseller of communication services may receive calls intended for multiple customers of the reseller. The reseller may identify the appropriate customers for each call and may transfer the calls accordingly. Rather than handling the calls, such a reseller instead supports its own customers by accepting the calls and extending the calls on to an appropriate call center.

To facilitate billing, such transfer situations require enhancement of the SIP REFER method to allow the transferring entity to be notified based not only on the portion of the call before and during the transfer, but also based on the remainder of the call after the transfer.

Moreover, such transfers may require further enhancement of the SIP REFER method to provide additional error information to a referrer. For example, the referrer may be provided notification messages through the SIP REFER implicit notification mechanism regarding various errors that may occur during the transfer. By receiving this enhanced information, the referrer may distinguish between actual errors during the SIP REFER method and other events such as a caller hanging up before the SIP REFER method is completed.

Yet further, to ensure that the implicit subscription may stay active beyond the transfer, the implicit subscription mechanism may be enhanced to permit refresh of an implicit subscription that has expired.

Thus, by providing one or more of these enhancements to the SIP REFER method, a service provider may provide for simplified troubleshooting, enhanced reporting, and enhanced billing services for call transfer situations.

Figure 1:
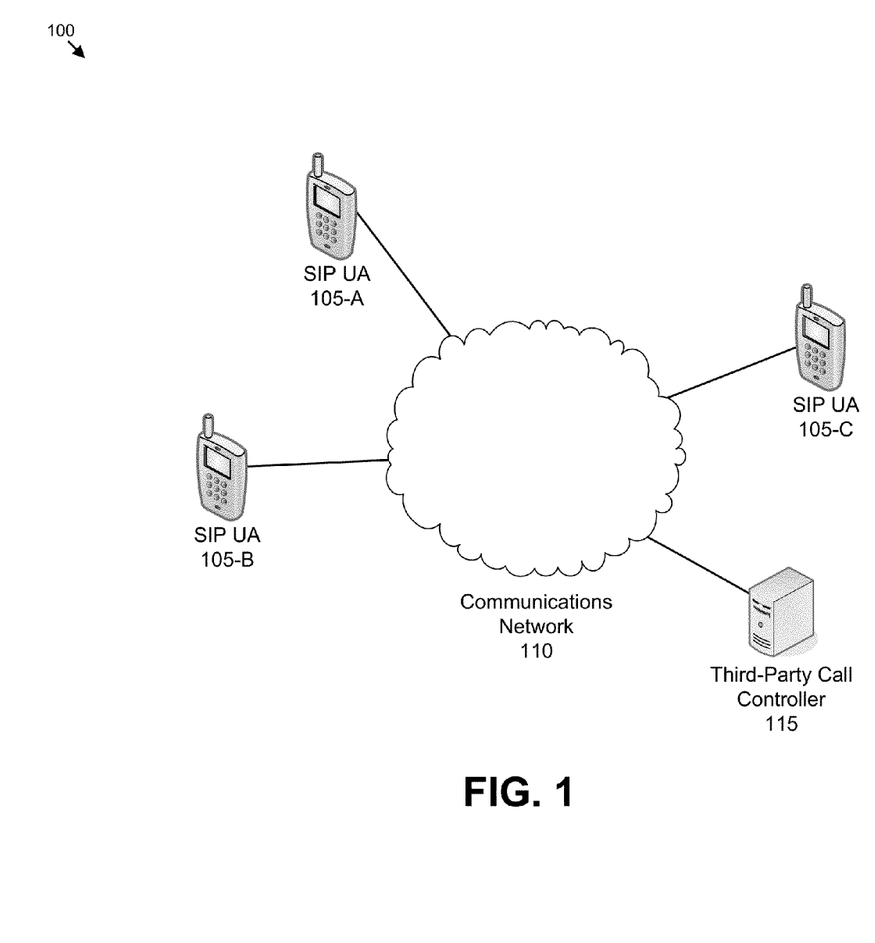
FIG. 1 illustrates an exemplary communications system configured to use the SIP signaling protocol.

FIG. 1 illustrates an exemplary communications system 100 configured to use the SIP signaling protocol. The system 100 may include a plurality of SIP user agents (UA) 105 configured to communicate over a communications network 110, such as by utilizing the services of a third-party call controller 115. System 100 may take many different forms and include multiple and/or alternate components and facilities. While an exemplary system 100 is shown in FIG. 1, the exemplary components illustrated in the Figure are not intended to be limiting. Indeed, additional or alternative components and/or implementations may be used. As an example, while three SIP UAs 105-A, 105-B and 105-C and one third-party call controller 115 are shown in the system 100, a communications system 100 may have more or fewer SIP UAs 105 and/or third-party call controllers 115.

A SIP user agent (UA) 105 is a type of network resource that may serve as a logical network end-point to create, send and/or receive SIP messages of a communication session. A SIP phone is one type of SIP UA 105. A SIP UA 105 may perform the role of a User Agent Client (UAC), which sends SIP requests, and the User Agent Server (UAS), which receives the requests and returns a SIP response. In some instances, a third party call controller 115 may set up and manage a communications session such as a telephone call between two or more UAs 105. In other instances, two SIP UAs 105 may set up and manage a communication session between one another without requiring a third party call controller 115.

The communications network 110 may provide communications services, including packet-switched network services (e.g., Internet access and/or VoIP communication services) to at least one SIP UA 105. Correspondingly, each SIP UA 105 on the communications network 110 may have its own unique device identifier which may be used to indicate, reference, or selectively connect to a particular SIP UA 105 on the communications network 110. Similar to how web resources may be referenced textually by uniform resource locators (URLs), resources accessible by a SIP communications network 110 may be identified by Uniform Resource Identifiers (URIs). As an example, a SIP UA 105 may be identified by a URI. The URI scheme used for SIP is "sip:" (or "sips:" for secure transmission), rather than, for example, "http" or "https" as typically used by the HTTP protocol. A typical SIP URI may be of the form: "sip:username:password@host:port".

SIP signaling includes request and response message types, also similar to the request and response model of HTTP. SIP Request messages include a method identifier indicating the type of request and also a Request-URI indicating the destination of the message. SIP responses must include a response code that may indicate an error or a success status code. SIP response messages may be provisional or final. A provisional response indicates progress and does not terminate a SIP transaction. For example, 1xx responses such as "100 Trying" and "180 Ringing" are provisional. Final responses, however, do terminate a SIP transaction. All 2xx, 3xx, 4xx, 5xx, and 6xx responses are final. 2xx responses indicate success and confirm that a request has been accepted. 3xx responses indicate a redirect and serve to inform a caller of an alternative location to where the request should be sent. 4xx responses indicate request failure, and serve to inform a caller a request has not been processed successfully (e.g., "404 Not Found"). 5xx responses indicate that the server has erred (e.g., a "503 response" indicates that a server is temporarily unable to process the request due to overloading or maintenance of the server). 6xx responses indicate a global failure regarding a particular user. By way of SIP signaling, a caller at a SIP UA 105 may initiate a SIP session from his/her SIP UA 105 to another SIP UA 105 accessible over the communications network 110.

A third-party call controller 115 may be in communication with the SIP UAs 105 via the communications network 110, and may be configured to control SIP sessions independently of the media endpoints that actually transmit and receive within the sessions. As some examples, the SIP call controller 115 may be configured to initiate SIP sessions, manage endpoint connectivity within SIP sessions, manage media type and codec selection for use within SIP sessions, and terminate SIP sessions.

As mentioned above, one extension to SIP is the SIP REFER method defined in RFC 3515, which provides an extension allowing parties to a session to "refer" recipients to a resource provided in a REFER request. A SIP REFER request includes the method identifier REFER. The resource to which the parties may be referred is identified in a Refer-To header field of the SIP REFER request as a Request-URI. Thus there may be three parties to a SIP REFER: a "REFER-Issuer" SIP UA 105 issuing the REFER request, a "REFER-Recipient" SIP UA 105 receiving the REFER request, and a "REFER-Target" SIP UA 105 designated in the Refer-To URI. Accordingly, the SIP REFER request indicates that the recipient of the REFER method should contact the "REFER target" SIP UA 105 using the contact information provided in the Refer-To header of the request. In some examples, the third-party call controller 115 may be utilized as the REFER-Recipient requested to perform the change of session endpoint to the REFER-Target specified in the REFER request.

As one enhancement, the SIP REFER method may be improved to allow a party to be informed when a transferred call session completes. SIP REFER presently allows for notification back to a requester of the status of a REFER request through an implicit subscription mechanism. Upon receipt of a SIP REFER request by a recipient SIP UA 105 receiving the request, the recipient SIP UA 105 returns a response to the requester including a code signifying whether or not the SIP REFER request has been accepted. If the request is accepted, typically the SIP UA 105 sends a 2xx class response to the requester, such as the generic "202 Accepted." If the SIP REFER request is accepted, the recipient is then required to create an implicit subscription and send notifications of the status of the SIP REFER back to the requester. It is through this implicit subscription mechanism that the SIP REFER method allows the party sending the SIP REFER request to be notified of the outcome of the SIP REFER request. As defined, the implicit subscription results in at least one NOTIFY being sent from the recipient of the REFER to the requester of the REFER.

SIP REFER does not, however, presently provide notification to the requester after the transfer has been completed. To allow the original requester of a SIP REFER message to determine the ultimate disposition of a dialog, the SIP REFER implicit subscription mechanism may be enhanced to provide for extended SIP REFER notification until the dialog ends, not merely until the SIP REFER itself has been completed.

As a further enhancement, the SIP REFER method may be enhanced to provide error or status information sufficient to inform a party of the reason of a failed call transfer. As defined in RFC 3515, the SIP REFER method does not require any specific information to be included in the SIP REFER message body. Rather, a minimal, but complete, implementation of the SIP REFER implicit subscription can respond with a single NOTIFY message. This NOTIFY message may contain the body "SIP/2.0 100 Trying", or if the subscription is pending, the body "SIP/2.0 200 OK", or if the reference was successful, the body "SIP/2.0 503 Service Unavailable", or if the reference failed, the body "SIP/2.0 603 Declined" if the REFER request was accepted before approval to follow the reference could be obtained and that approval was subsequently denied.

Figure 3:
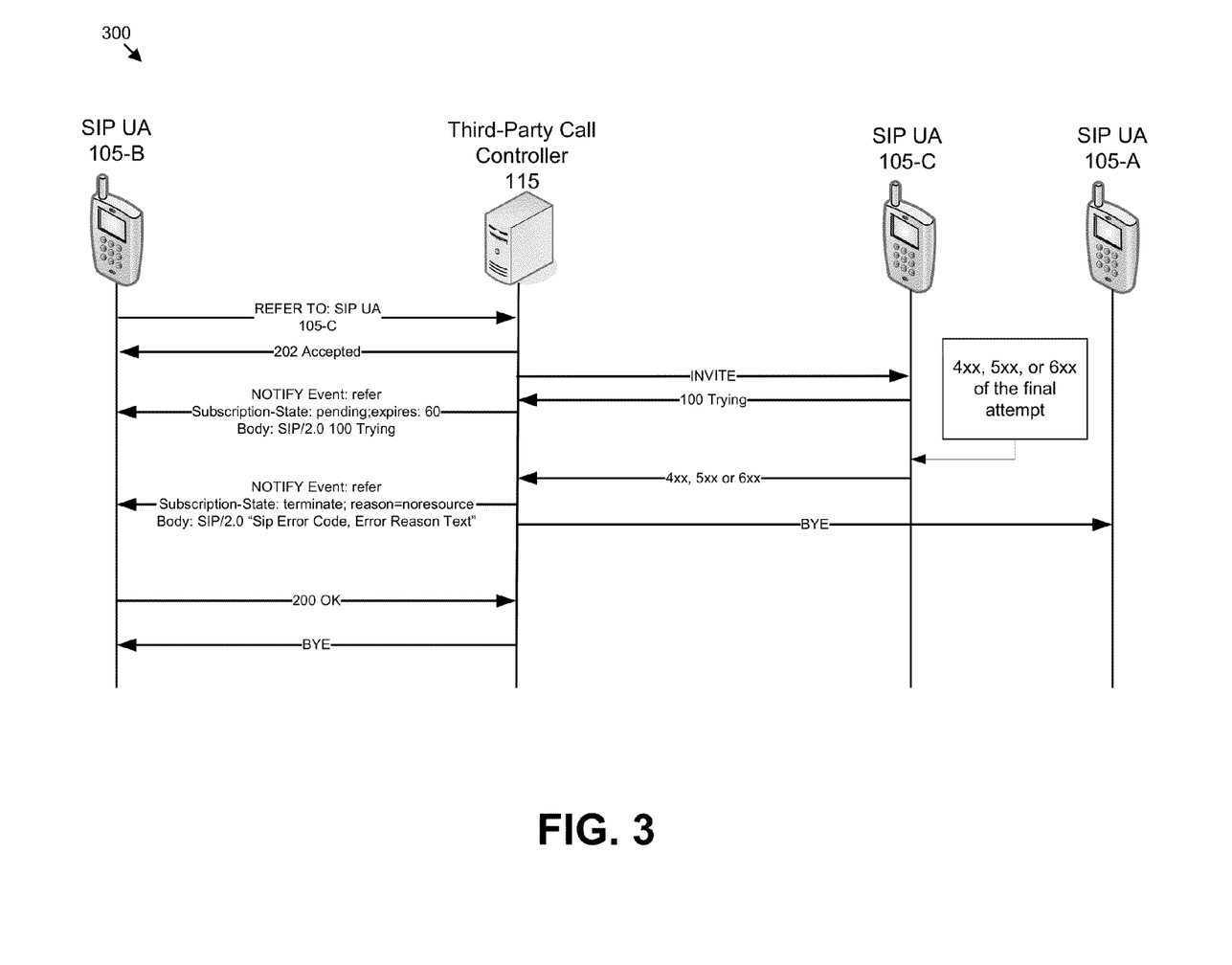
FIG. 3 illustrates an exemplary call flow diagram for a SIP REFER implicit subscription sequence in which the call transfer fails.
Figure 4:
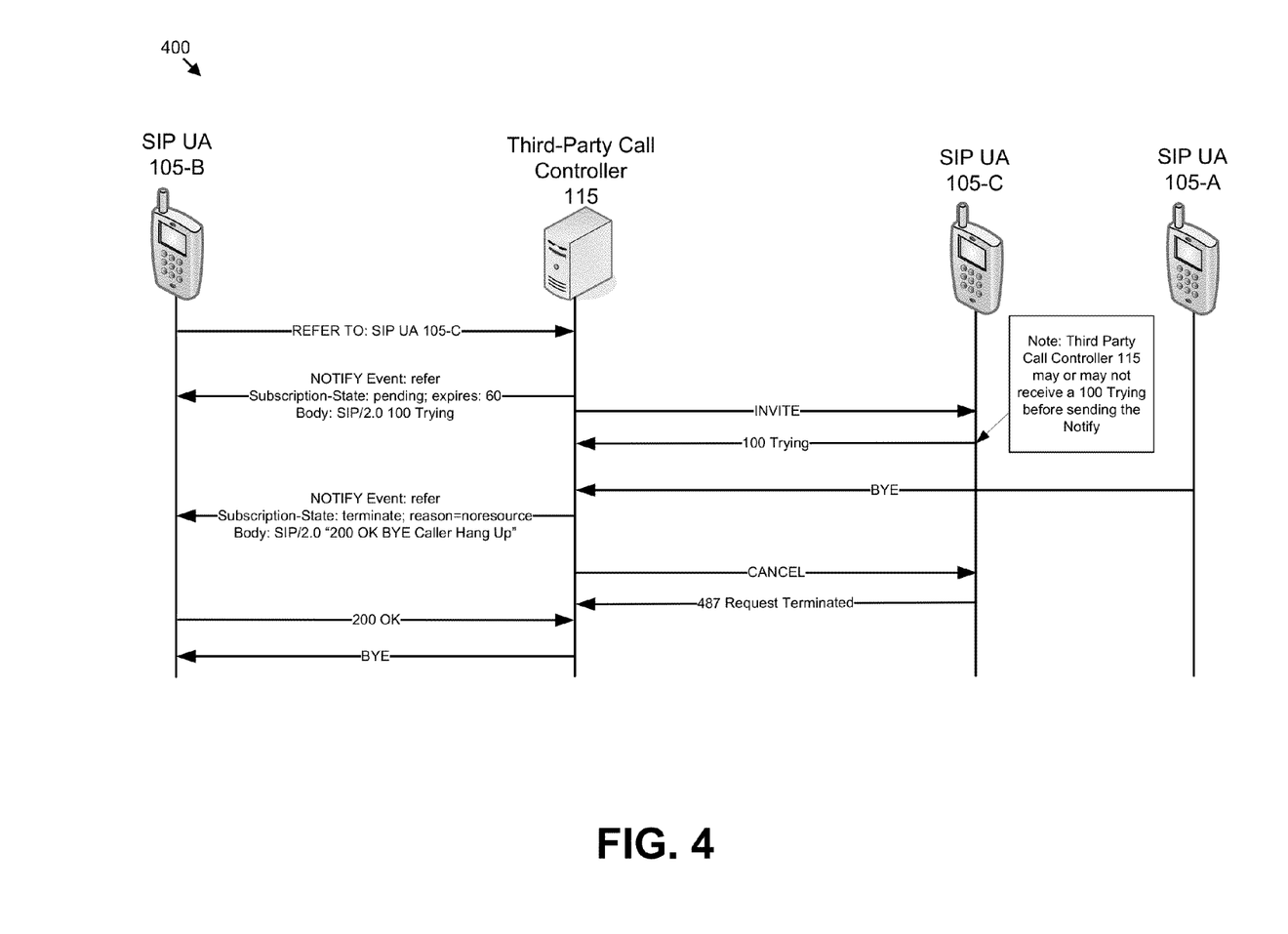
FIG. 4 illustrates an exemplary call flow diagram in which a dialog initiator ends a dialog before the SIP REFER is complete.

Such minimal information may comply with the RFC, but gives no indication to the REFER-Issuer of the reason for failure of the SIP REFER. As a consequence, a REFER-Issuer may be unable to determine the reason behind termination or disposition of a transferred call. For example, a REFER-Issuer may wish to determine whether a caller hung up during a SIP REFER method, but without additional information the REFER-Issuer will be unable to distinguish a caller hang-up from cases in which an error may have occurred during the SIP REFER method itself. Indeed, a caller hanging up is not an error related to the SIP REFER method itself, and such an outcome instead merely indicates that the call dialog was ended in a normal state while the SIP REFER was being processed. Accordingly, to allow a REFER-Issuer to distinguish at least between these scenarios, the SIP REFER method notification messages as part of the implicit subscription may be extended to provide for notification of the natural scenarios in which a caller being transferred elects to hang up. FIGS. 3 and 4 discussed in detail below illustrate exemplary scenarios in which the SIP REFER has been extended to provide notification of the reason for failure of a SIP REFER.

As yet a further enhancement, the SIP REFER method may be enhanced to provide for the refresh of an implicit subscription that has expired. As defined, while the SIP REFER method permits an implicit subscription to be refreshed while the refer dialog is still active, the SIP REFER method does not provide any mechanism for refreshing an implicit subscription after it has expired. Thus in some instances, such as due to a temporary network delay, if the implicit subscription for a SIP REFER expires, the implicit subscription cannot be brought back. To address this issue, a mechanism may be implemented that allows for a refresh request to revive an expired implicit subscription for an amount of time after the implicit subscription has expired. The mechanism may provide a configurable value representing an amount of time to honor requests to refresh an implicit subscription after the implicit subscription has expired.

Figure 7:
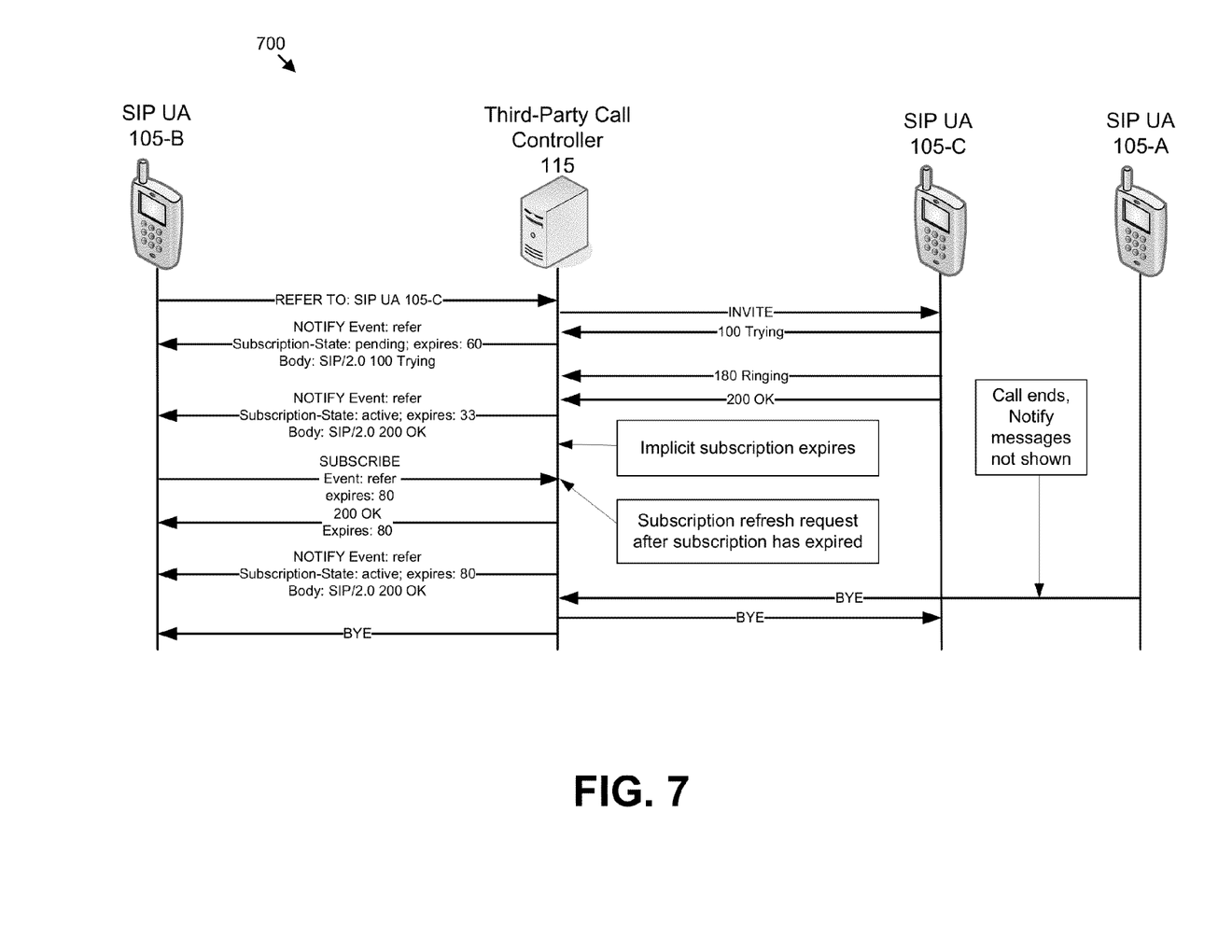
FIG. 7 illustrates an exemplary call flow diagram in which a subscriber refreshes a subscription that has expired.

As some examples, a value of infinite would allow for refresh of the implicit subscription until the underlying SIP REFER dialog has expired. An exemplary value of 10 seconds would allow for refresh of the implicit subscription for 10 seconds after expiration up until the underlying SIP REFER dialog has expired. A value of zero would be equivalent to existing functionality without enhancement, where once the implicit subscription expires it cannot be brought back. FIG. 7 is discussed in detail below and illustrates an exemplary scenario in which the SIP REFER has been extended to allow for the refresh of an implicit subscription that has expired.

With these additional enhancements, the SIP REFER method may be used to facilitate the introduction of more advanced calling and billing applications relating to call transfer.

In general, computing systems and/or devices, such as SIP UAs 105 and third-party controllers 115, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, New York, the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
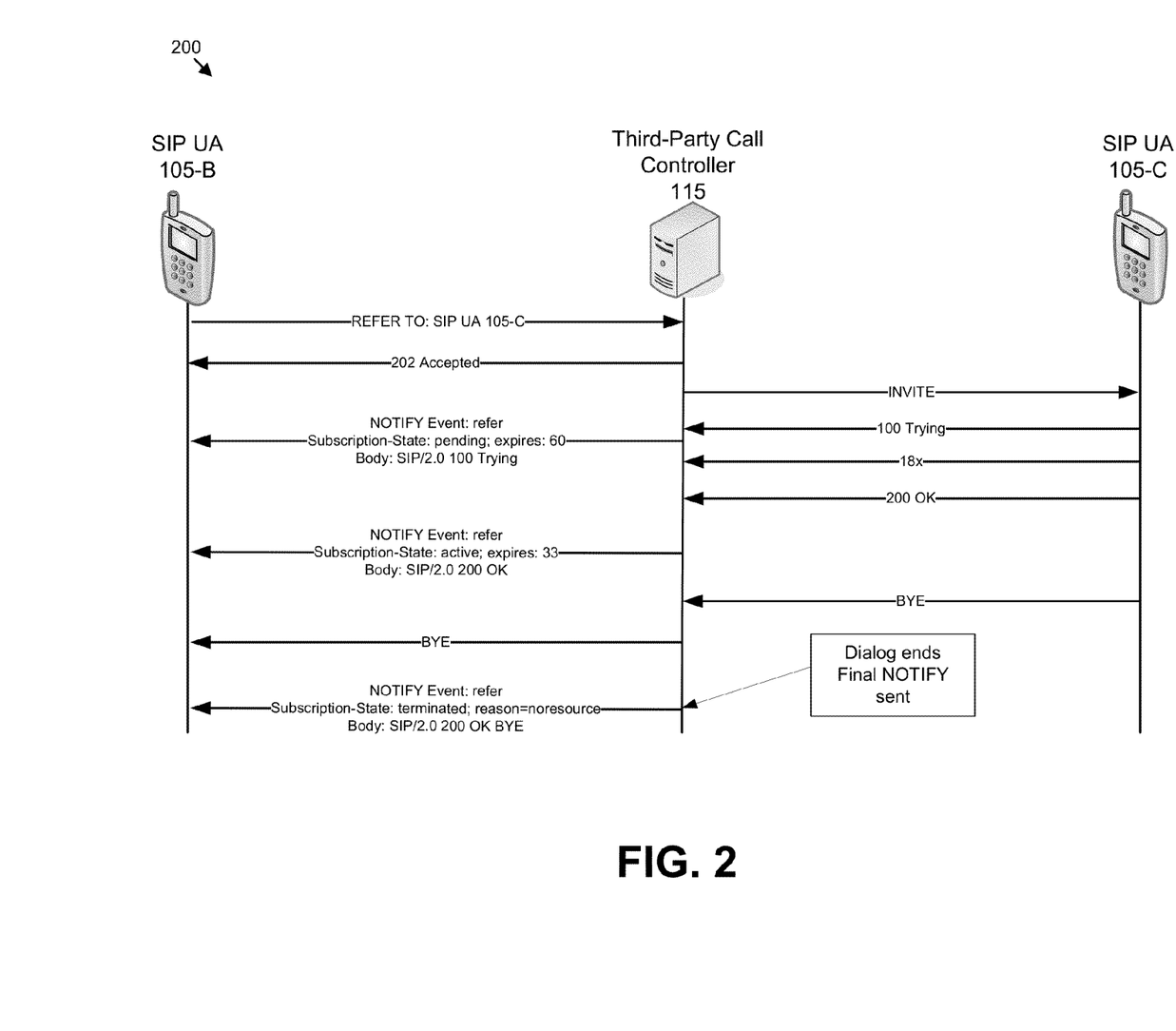
FIG. 2 illustrates an exemplary call flow diagram for a SIP REFER implicit subscription sequence extended to continue until termination of the referred call.

FIG. 2 illustrates an exemplary call flow diagram 200 for a SIP REFER implicit subscription sequence extended to continue until termination of the referred call. The call flow diagram 200 begins after a SIP session is already established between a SIP UA 105-A and the illustrated SIP UA 105-B. Within that session, the call flow diagram 200 illustrates a scenario in which SIP UA 105-B is referring the SIP UA 105-A to SIP UA 105-C using the services of a third-party call controller 115 as a REFER-Recipient. The call flow diagram 200 further illustrates how the SIP REFER notification may be extended to notify the REFER-Issuer SIP UA 105-B when the dialog between SIP UA 105-A and SIP UA 105-C is terminated, not merely when the referral of the caller from SIP UA 105-B to SIP UA 105-C has been completed.

As shown in the call flow diagram 200, a SIP REFER message may be sent from the SIP UA 105-B to the third-party call controller 115 via communications network 110. The SIP REFER message may specify the SIP UA 105-C in the Refer To field of the SIP REFER message. Accordingly, the third-party call controller 115 may receive the SIP REFER message and may initiate the referral of the SIP UA 105-A from SIP UA 105-B to SIP UA 105-C. Upon receipt of the SIP REFER message, the third-party call controller 115 may return response to the SIP UA 105-B, such as a "202 Accepted" response in the case where the SIP REFER message is accepted.

After accepting the SIP REFER message, the third-party call controller 115 may then send a SIP INVITE message to the SIP UA 105-C via the same or a different communications network 110. The third-party call controller 115 may further receive as response from the SIP UA 105-C, such as the exemplary "100 Trying" response as illustrated.

As part of the implicit subscription to the SIP REFER, the third-party call controller 115 may notify the SIP UA 105-B regarding the status of the SIP REFER dialog. For example, the third-party call controller 115 may notify the SIP UA 105-B that the subscription-state is pending or active and that the subscription expires in a certain amount of time. This notification message from the third-party call controller 115 may include further information in the body of the notification message. As shown, a notification is sent from the third-party call controller 115 to the SIP UA 105-B including information in its body indicative of status information received from the SIP UA 105-C, namely that the status of the SIP REFER is that the SIP UA 105-C is "SIP/2.0 100 Trying" when the subscription state is pending.

Additional notification messages may be received by the third-party call controller 115. For example, the SIP UA 105-C may send one or more messages to the third-party call controller 115, such as a 183 Session Progress message indicating the progress of the REFER, or a 200 OK message indicating that the SIP REFER has been completed (e.g., SIP UA 105-C answers). Some or all of these notifications to the third-party call controller 115 may result in additional notification messages being sent from the third-party call controller 115 to the SIP UA 105-B.

According to RFC 3515, once the SIP REFER from SIP UA 105-B to SIP UA 105-C has been completed, the implicit subscription of SIP UA 105-B for notifications relating to the referral is terminated. However, the call flow diagram 200 illustrates that the implicit subscription has been extended to continue until termination of the referred call. Notably, because the implicit subscription has been extended, after the BYE message is received by the third-party call controller 115 from the SIP UA 105-C, the SIP UA 105-B may be notified of the termination of the call through the implicit subscription mechanism as shown.

This final notification may thus be utilized by the SIP UA 105-B to keep track of the duration and termination of the transferred call, and accordingly update billing information relating to the transferred call, after the call was transferred. Moreover, the SIP UA 105-B may advantageously be notified of the final disposition of the transferred call without having to stay within a data path or a signaling path of the transferred call.

FIG. 3 illustrates an exemplary call flow diagram 300 for a SIP REFER implicit subscription sequence in which the call transfer fails. The call flow diagram 300 begins after a SIP session is already established between the SIP UA 105-A and the SIP UA 105-B. Within that session, the call flow diagram 300 illustrates a scenario in which SIP UA 105-B is referring the SIP UA 105-A to a SIP UA 105-C using the services of a third-party call controller 115. However, the SIP UA 105-C cancels, is unable to provide for, or otherwise causes the call transfer from SIP UA 105-B to SIP UA 105-C to fail.

Similar to as shown above with respect to call flow diagram 200, in call flow diagram 300 the SIP UA 105-B sends a SIP REFER message to the third-party controller 115 to transfer the SIP UA 105-A to SIP UA 105-C. The third-party controller 115 may receive the SIP REFER message, attempt to invite the SIP UA 105-C, and inform the SIP UA 105-B of its progress.

The SIP UA 105-C may further send a response to the third-party call controller 115 regarding the SIP REFER. As illustrated in the call flow diagram 300, the third-party call controller 115 receives a final response from the SIP UA 105-C during processing of the call transfer, such as a 4xx, 5xx or 6xx response.

Further, the SIP REFER method has been enhanced to provide error or status information sufficient to inform a party of the reason of a failed call transfer. For example, the third-party call controller 115 may include the error code, such as the 4xx, 5xx or 6xx response code, in a notification message sent to the SIP UA 105-B. Additionally or alternatively, the third-party call controller 115 may further include error reason text in the notification message sent to the SIP UA 105-B. It should be noted that RFC 3515 does allow for a complete implementation of the SIP REFER method to return simply "SIP/2.0 503 Service Unavailable", or if the reference failed, for example, the body "SIP/2.0 603 Declined" if the REFER request was accepted before approval to follow the reference could be obtained and that approval was subsequently denied. Extension of the SIP REFER method to include the response code and/or reason text informs the referrer of the reason for the failed call transfer, which may be useful when determining how to bill at least that portion of the SIP session.

In addition to informing the SIP UA 105-B of the failed call transfer, the third-party call controller 115 may further send BYE messages to the SIP UA 105-A and SIP UA 105-B indicating removal of the third-party call controller 115 from processing the failed call transfer.

FIG. 4 illustrates an exemplary call flow diagram 400 in which a dialog initiator ends a dialog before the SIP REFER is complete. The call flow diagram 400 begins after a SIP session is already established between the SIP UA 105-A and the SIP UA 105-B. Within that session, the call flow diagram 400 illustrates a scenario in which SIP UA 105-B is referring the SIP UA 105-A to a SIP UA 105-C using the services of a third-party call controller 115. However, as compared to the call flow diagram 300 where in the SIP UA 105-C causes the transfer to fail, in call flow diagram 400 the SIP UA 105-A elects to terminate the session before the call transfer from SIP UA 105-B to SIP UA 105-C is complete.

More specifically, in call flow diagram 400 the SIP UA 105-B sends a SIP REFER message to the third-party controller 115 to transfer the SIP UA 105-A to SIP UA 105-C. The third-party controller 115 may receive the SIP REFER message, attempt to invite the SIP UA 105-C, and inform the SIP UA 105-B of its progress. The SIP UA 105-C may further send a response to the third-party call controller 115 regarding the SIP REFER. Notably, the third-party call controller 115 may or may not receive a "100 Trying" response from the SIP UA 105-C before sending a notify message to the SIP UA 105-B.

However, during the processing of the call transfer, the SIP UA 105-A discontinued the SIP session. For example, the SIP UA 105-A may have hung up the call. As a result, a BYE message may be sent by the SIP UA 105-A and received by the third-party call controller 115. The third-party call controller 115 may in turn send a notify message to the SIP UA 105-B, the body of the notification message including an error code and/or error reason text relating to termination of the SIP session by the SIP UA 105-A. The SIP UA 105-B may accordingly use this information to distinguish between failed call transfers and instances where the SIP UA 105-A elects to discontinue the call. The third-party call controller 115 may further receive an acknowledgement of the notify message from the SIP UA 105-B, such as in the form of a "200 OK" response.

The third-party call controller 115 may further send a BYE message to the SIP UA 105-B, and send a cancel message to the SIP UA 105-C. The third-party call controller 115 may accordingly receive a response message from the SIP UA 105-C in response to the cancel message, such as a "487 Request Terminated" response.

Figure 5:
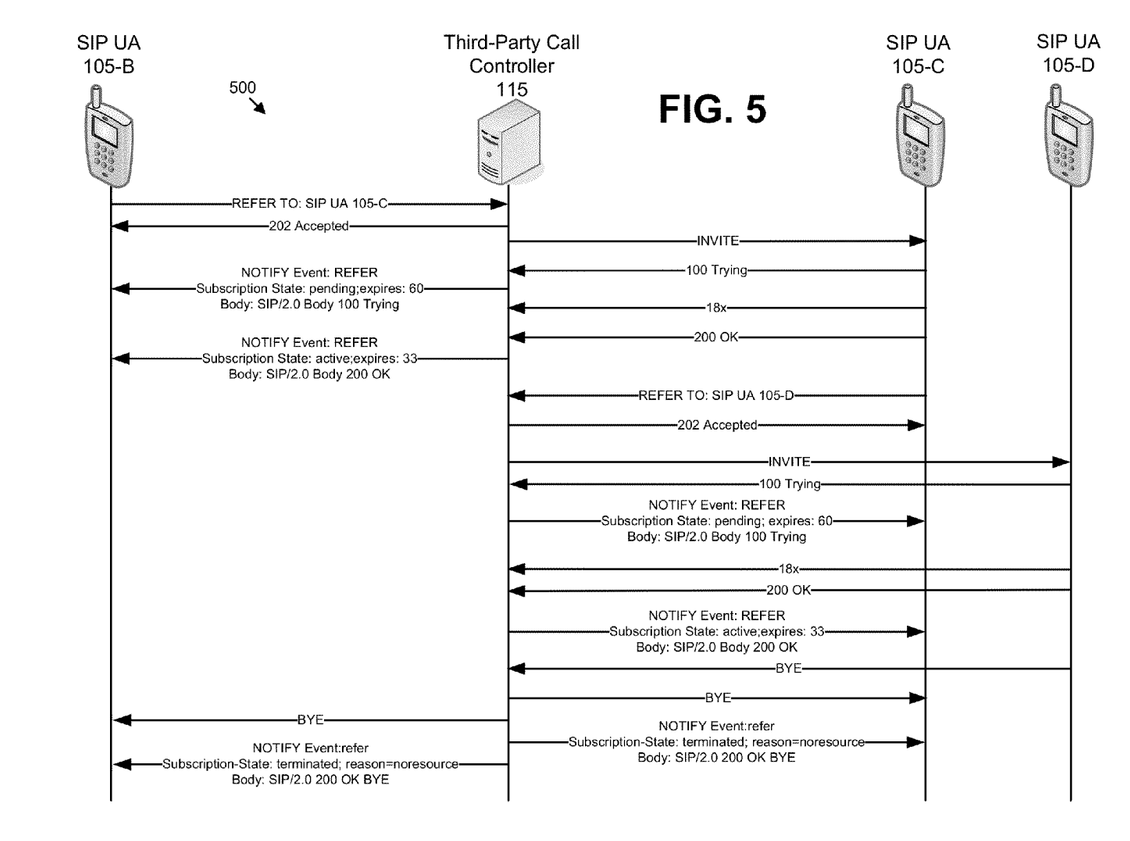
FIG. 5 illustrates an exemplary call flow diagram having a multiple references scenario.

FIG. 5 illustrates an exemplary call flow diagram 500 having a multiple references scenario. The call flow diagram 500 begins after a SIP session is already established between the SIP UA 105-A and the SIP UA 105-B. Within that session, and similar to as discussed above, the call flow diagram 500 illustrates a scenario in which SIP UA 105-B is referring the SIP UA 105-A to a SIP UA 105-C using the services of a third-party call controller 115. However, in the call flow diagram 500, after the call is referred to the SIP UA 105-C, the SIP UA 105-C in turn uses the services of the third-party call controller 115 to further refer the call to SIP UA 105-D. The call is then successfully transferred to the SIP UA 105-D.

At this point after the transfer to the SIP UA 105-D, there is both an enhanced implicit subscription of the SIP UA 105-B until the completion of the call transferred to SIP UA 105-C, and also an enhanced implicit subscription of the SIP UA 105-C until the completion of the same call transferred to SIP UA 105-D.

As shown, the SIP UA 105-D indicates to the third-party call controller 115 that the call has been completed by sending a BYE message to terminate the session. The third-party call controller 115 receives the BYE message and then updates the SIP UA 105-B and the SIP UA 105-C based on BYE message.

Further, the third party call controller 115 may send BYE messages to each of the SIP UA 105-B and the SIP UA 105-C to terminate the respective sessions with the SIP UA 105-B and the SIP UA 105-C. The third party call controller 115 further notifies the SIP UA 105-C using the enhanced implicit subscription mechanism of completion of the call transferred to SIP UA 105-D. Moreover, the third party call controller 115 further notifies the SIP UA 105-B using the enhanced implicit subscription mechanism of completion of the call transferred to SIP UA 105-C. Notably as illustrated these two notification messages may further be enhanced to include the reason for termination of the call, in this case "200 OK BYE."

Figure 6:
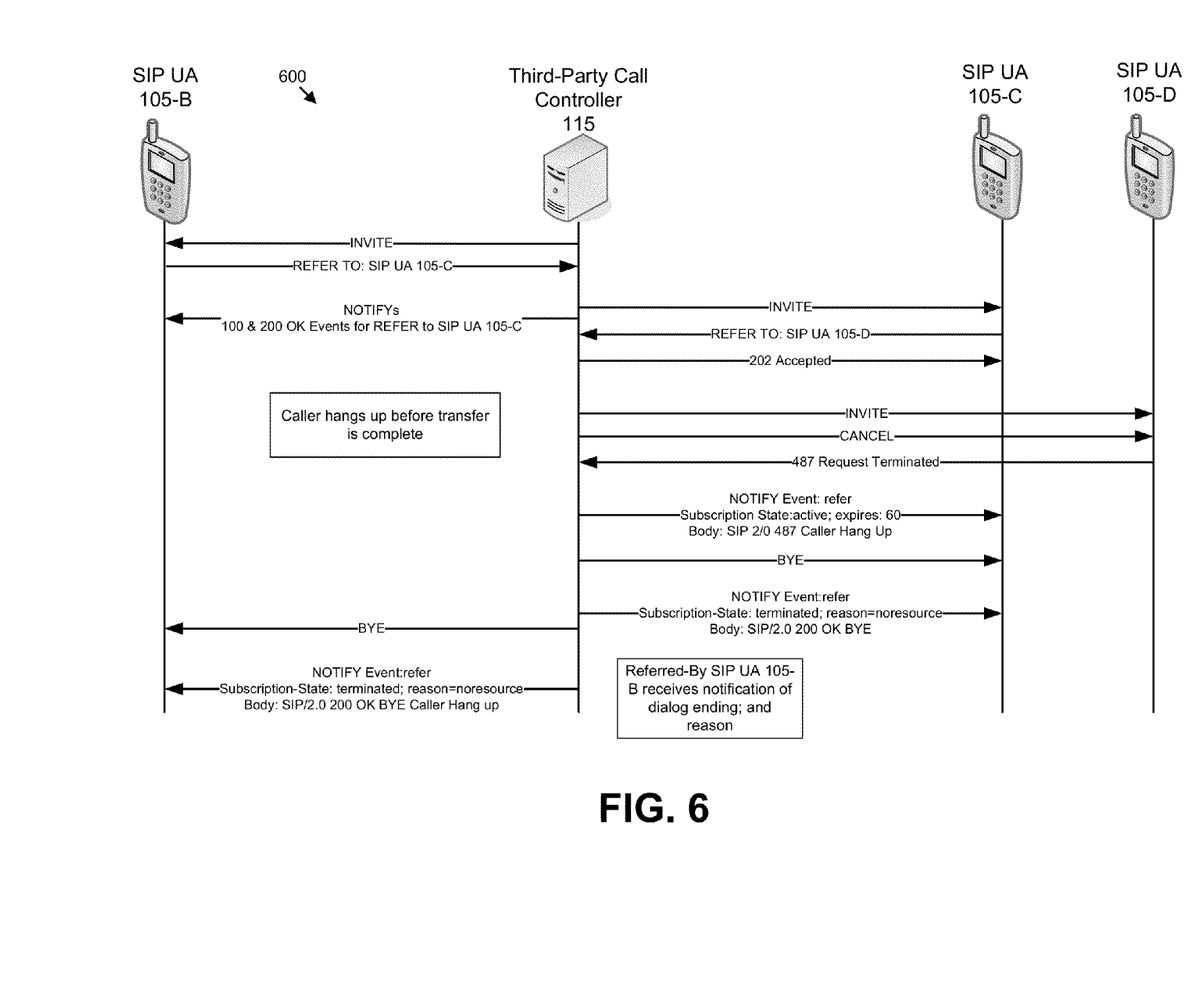
FIG. 6 illustrates an exemplary call flow diagram having a multiple references situation and also in which a dialog initiator ends a dialog during a subsequent transfer.

FIG. 6 illustrates an exemplary call flow diagram 600 having a multiple references situation and also in which a dialog initiator ends a dialog during a subsequent transfer. The call flow diagram 600 also begins after a SIP session is already established between the SIP UA 105-A and the SIP UA 105-B. Similar to as discussed above with respect to call flow diagram 500, the SIP UA 105-B may refer the SIP UA 105-A to a SIP UA 105-C using the services of a third-party call controller 115, whereupon the SIP UA 105-C may further use the services of the third-party call controller 115 to attempt to refer the call to SIP UA 105-D. However, similar to as discussed above with respect to the call flow diagram 400, the SIP UA 105-A may terminate the SIP session before the referral of the call to SIP UA 105-D is complete.

Upon receiving the indication that the SIP UA 105-A has terminated the call, the third-party call controller 115 may send a CANCEL message to the SIP UA 105-D to inform the SIP UA 105-D that the SIP REFER will no longer need to take place. The SIP UA 105-D may accordingly respond to the cancel message with a response such as a "487 Request Terminated" response.

The third-party call controller 115 may further use the enhanced implicit subscription mechanism to inform the SIP UA 105-C of termination of the SIP REFER method, as well as optionally providing enhanced information regarding the response received from the SIP UA 105-D regarding termination of the SIP REFER method (i.e., "487 Request Terminated"). The third-party call controller 115 may also use the enhanced implicit subscription mechanism to inform the SIP UA 105-B of termination of the SIP dialog, as well as optionally providing enhanced information regarding the reason for termination of the SIP session (i.e., "200 OK BYE Caller Hang up").

FIG. 7 illustrates an exemplary call flow diagram in which a subscriber refreshes a subscription that has expired. The call flow diagram 700 begins after a SIP session is already established between the SIP UA 105-A and the SIP UA 105-B. Within that session, and similar to as discussed above, the call flow diagram 700 illustrates a scenario in which SIP UA 105-B is referring the SIP UA 105-A to a SIP UA 105-C using the services of a third-party call controller 115. While the implicit subscription of SIP UA 105-B to the SIP REFER to SIP UA 105-C is enhanced to extend until completion of the transferred call, the implicit subscription runs only for a limited amount of time.

Typically, the implicit subscription is refreshed by sending a SUBSCRIBE event specifying an amount of time to keep the implicit subscription alive. However, as defined in RFC 3515, the implicit subscription can only be refreshed before it has expired.

As shown in the call flow diagram 700, the SIP UA 105-B is implicitly subscribed to the SIP REFER of a call to the SIP UA 105-C. As further illustrated in the call flow diagram 700, a SUBSCRIBE event specifying an additional 80 seconds for the implicit subscription is sent from the SIP UA 105-B. However, the SUBSCRIBE event is not received by the third-party call controller 115 until after expiration of the implicit subscription.

In some cases, the SUBSCRIBE event from the SIP UA 105-B may be sent too late to be received by the third-party call controller 115 before expiration of the implicit subscription. In other cases, the SUBSCRIBE event from the SIP UA 105-B may be sent from the SIP UA 105-B in a timely manner, but may encounter network congestion or other issues and fail to be delivered in time (or even be delivered at all). To provide for a more robust ability to preserve the implicit subscription, the implicit subscription mechanism may be enhanced to allow for SUBSCRIBE event to be honored after the implicit subscription has expired.

As an example, the enhanced SIP REFER mechanism may provide a configurable value representing an amount of time to honor requests to refresh an implicit subscription after the implicit subscription has expired. A longer value may provide for a greater amount of time for receipt of the SUBSCRIBE event, but at the expense of utilizing additional resources of the third-party call controller 115 which may be unable to tear down the implicit subscription until the additional configurable amount of time has passed after expiration of the implicit subscription. Another factor beyond resource utilization to consider may be that leaving too long of a window for revival could be exploited in a denial of service attach against the third-party call controller 115. Accordingly, the specific configurable value or values used for the additional amount of time to honor SUBSCRIBE requests may be configurable by a system administrator.

In this period of time wherein the implicit subscription has expired but a SUBSCRIBE event would still be honored, the referred-by party of the implicit subscription typically would not receive any notification messages related to the implicit subscription that has expired but has not yet been revived.

Figure 8:
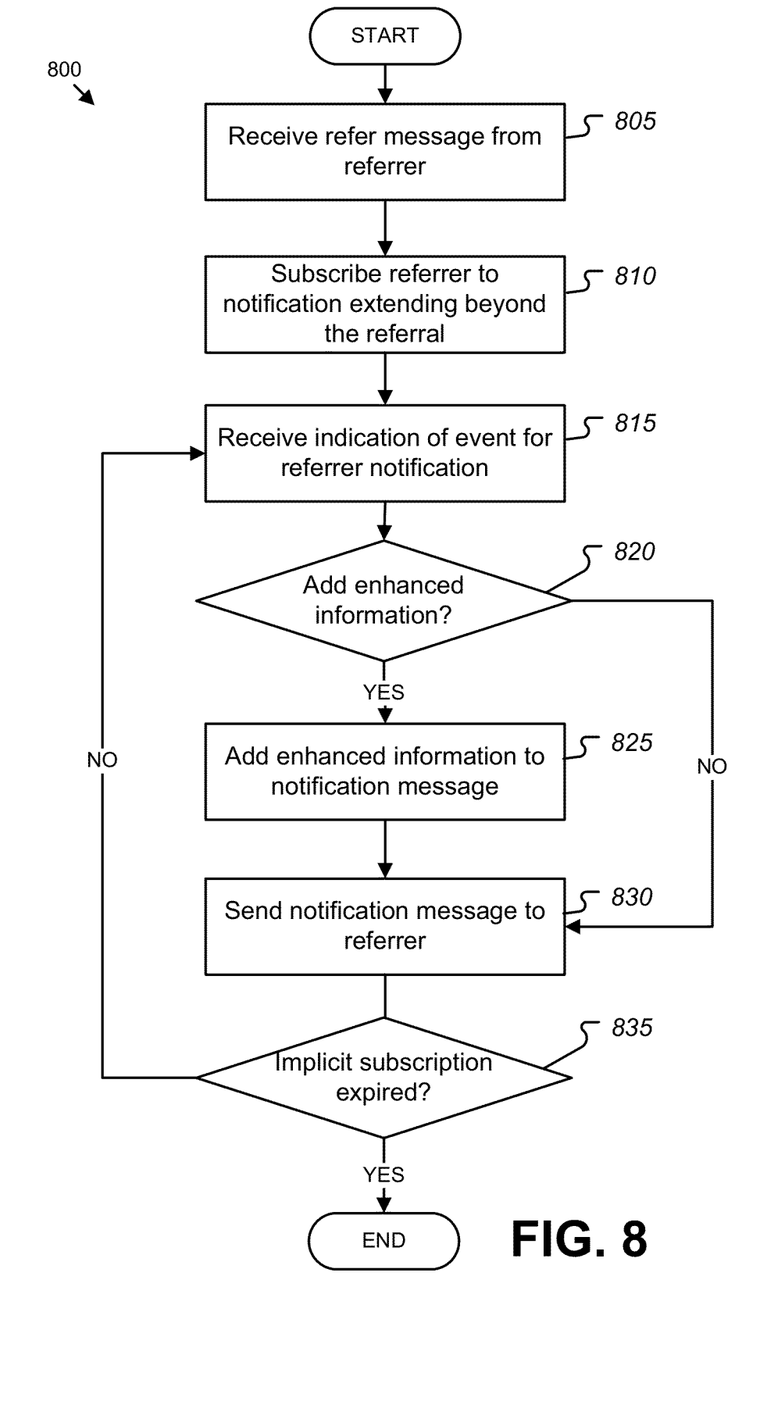
FIG. 8 illustrates an exemplary process for sending a notification message according to an enhanced implicit subscription.

FIG. 8 illustrates an exemplary process 800 for sending a notification message according to an enhanced implicit subscription. The process 800 may be performed by various devices, such as the third-party call controller 115 of the communications system 100.

In block 805, the device receives a refer message from a referrer. For example, the third-party call controller 115 may receive as a REFER-Recipient, from a REFER-Issuer, a SIP REFER message. The SIP REFER message may be configured to transfer a first endpoint of a call session to a REFER-Target, the call session being between at least the first endpoint at a first communications device and a second endpoint at a second communications device. The refer message may be configured to cause the third-party call controller 115 to transfer the first endpoint of the call session from the first communications device to a third communications device. In some examples, at least one of the first, second and third communications devices are SIP UAs 105.

In block 810, the device subscribes the referrer to a notification extending beyond the referral. For example, the third-party call controller 115 may subscribe the first communications device by way of the SIP REFER implicit subscription mechanism to notification messages associated with the transferred call session. Rather than extending only until completion of the transfer from the first communications device to the third communications device, the implicit subscription may be enhanced to extend beyond the call transfer, such as until termination of the call.

In block 815, the device receives notification of an event for referrer notification. For example, the third-party call controller 115 may receive a message from the third communications device indicating completion of the transferred call. As another example, the third-party call controller 115 may receive a message from the first communications device indicating that the caller using the first communications device terminated the call.

In decision point 820, the device determines whether to add enhanced information to a notification message. For example, the third-party call controller 115 may determine to include information in the body of a notification message indicative of status or other information received by the third-party call controller 115 from the first or third communications devices. In other examples, the third-party call controller 115 may determine not to add enhanced information to the notification message. If the third-party call controller 115 determines that enhanced information should be added, block 825 is executed next; otherwise, block 830 is executed next.

In block 825, the device adds enhanced information to a notification message. For example, the third-party call controller 115 may include information in the body of a notification message indicative of status or other information received by the third-party call controller 115 from the first or third communications devices.

In block 830, the device sends the notification message to the referrer. For example, the third-party call controller 115 may use the enhanced implicit subscription mechanism to inform the second communications device of termination of the call. This notification may be sent even after completion of the call transfer from the second communications device to the third communications device.

In decision point 835, the device determines whether the implicit subscription has expired. For example, if the implicit subscription has not yet expired, the third-party call controller 115 may transfer control to block 815 to await further events for notification. If the third-party call controller 115 determines that the implicit subscription has expired, however, the process 800 ends.

Figure 9:
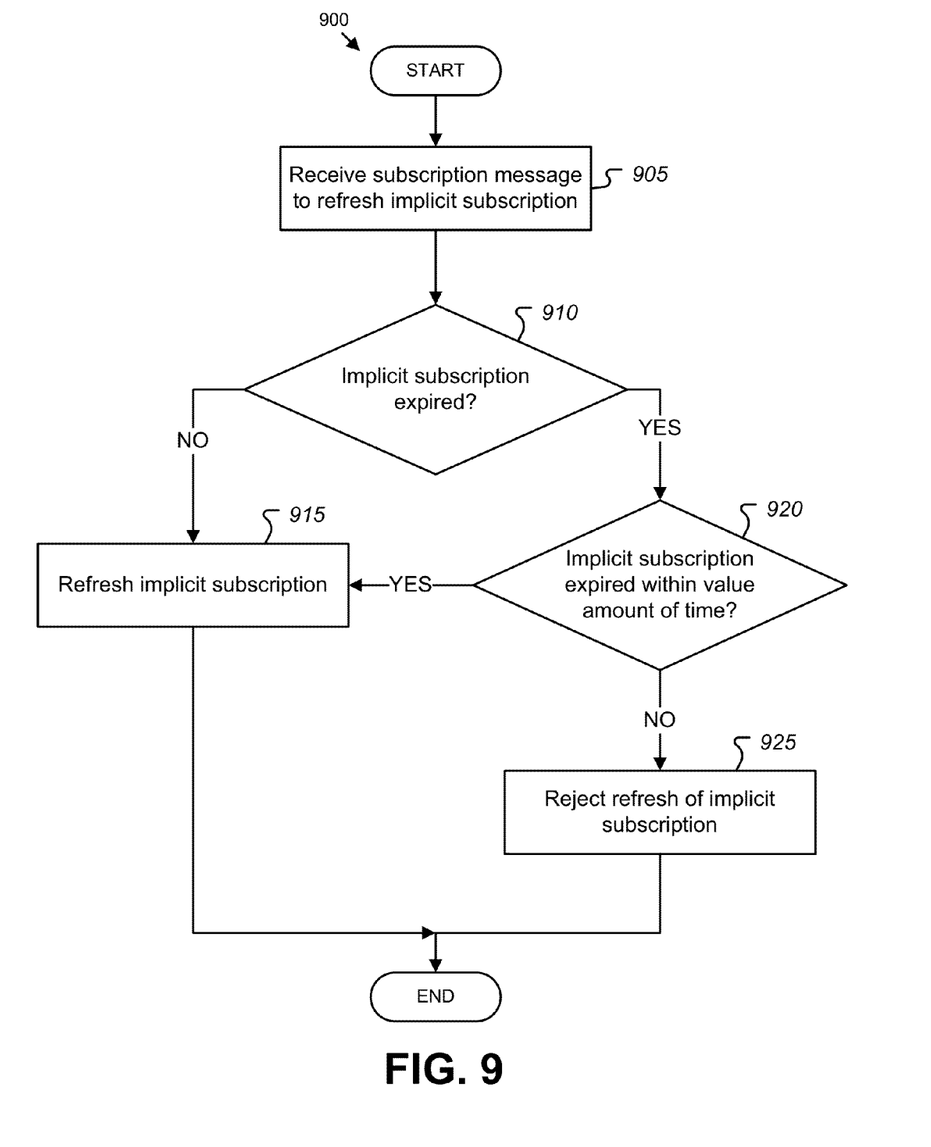
FIG. 9 illustrates an exemplary process for a refresh of an expired implicit subscription.

FIG. 9 illustrates an exemplary process 900 for a refresh of an expired implicit subscription. As with the process 800, the process 900 may be performed by various devices, such as the third-party call controller 115 of the communications system 100.

In block 905, the device receives a subscription message to refresh an implicit subscription. For example, the third-party call controller 115 may receive a SUBSCRIBE message from a SIP UA 105 to extend an implicit subscription of the SIP UA 105 for notification messages of a SIP REFER method.

In decision point 910, the device determines whether the implicit subscription has expired. For example, the third-party call controller 115 may make the determination whether the implicit subscription has expired and transfer control either to block 915 or decision point 920 accordingly. If the implicit subscription has not expired control passes to block 915. Otherwise, control passes to block 920.

In block 915, the device refreshes the implicit subscription. For example, the third-party call controller 115 may extend the time remaining on the implicit subscription according to the amount of time specified by the received SUBSCRIBE message.

In decision point 920, the device further determines whether the implicit subscription expired within a predetermined value amount of time. For example, the third-party call controller 115 may determine when the implicit subscription expired, and may determine whether the amount of time since then is within the predetermined amount of time. If the expiration is within the predetermined amount of time, then control passes to block 915. Otherwise, control passes to block 925.

In block 925, the device rejects the refresh of the implicit subscription. For example, because too much time has passed since the implicit subscription has expired, the third-party call controller 115 may elect not to refresh the implicit subscription. After block 925, the process 900 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope of the application should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a call controller configured to:
      receive a refer message configured to transfer a first endpoint of a call session, the call session being between at least the first endpoint at a first communications device and a second endpoint at a second communications device, the refer message indicating to transfer the first endpoint from the first communications device to a third communications device;
      subscribe the first communications device to notification messages associated with the referral of the transferred call session, the subscription to the referral extending beyond the call transfer until termination of the call;
      receive a subscribe message from the first communications device configured to refresh the subscription;

determine whether the subscription has expired, and if so whether the subscription has expired within a predetermined amount of time if the subscription has not expired or if the subscription has expired within the predetermined amount of time, refresh the subscription;

otherwise, reject the refresh of the subscription; and send, if the subscription has not expired or is refreshed, through the subscription to the first communications device, a notification message indicating termination of the transferred call.

2. The system of claim 1, wherein the first communications device receives the notification message without remaining in a signaling path or a data path of the transferred call.

3. The system of claim 1, wherein the refer message is a SIP REFER message, the subscription is an implicit subscription to the SIP REFER, and the notification message is a SIP implicit notification message received according to the implicit subscription to the SIP REFER.

4. The system of claim 1, wherein the first communications device, second communications device, and third communications device are SIP user agents.

5. The system of claim 1, wherein the predetermined amount of time is set by a system administrator.

6. The system of claim 1, wherein the first communications device is further configured to send a subscribe message to the call controller configured to refresh the subscription.

7. The system of claim 1, wherein the notification message further includes information sufficient to inform a party of a reason of a failed call transfer.

8. The system of claim 7, wherein the notification message includes at least one of a response code and reason text received from the third communications device relating to termination of the call.

9. The system of claim 7, wherein the notification message further includes information sufficient to inform a party whether the call was terminated normally by the second communications device during the call transfer.

10. A method, comprising:

receiving a refer message configured to transfer a first endpoint of a call session, the call session being between at least the first endpoint at a first communications device and a second endpoint at a second communications device, the refer message indicating to transfer the first endpoint from the first communications device to a third communications device;

subscribing the first communications device to notification messages associated with the referral of the transferred call session, the subscription to the referral extending beyond the call transfer until termination of the call;

receiving a subscribe message from the first communications device configured to refresh the subscription;

determining whether the subscription has expired, and if so whether the subscription has expired within a predetermined amount of time if the subscription has not expired or if the subscription has expired within the predetermined amount of time, refreshing the subscription;

otherwise, rejecting the refresh of the subscription; and sending, if the subscription has not expired or is refreshed, through the subscription to the first communications device, a notification message indicating termination of the transferred call.

11. The method of claim 10, further comprising receiving the predetermined amount of time from a system administrator.

12. The method of claim 10, further comprising including information in the notification message indicative of whether the call was terminated normally by the second communications device during the call transfer.

13. The method of claim 10, further comprising including information received from the third communications device relating to termination of the call in the notification message, the information including at least one of a response code and a textual indication of a reason for call termination.

14. A non-transitory computer-readable medium storing a software program, the software program being executable to provide operations comprising:

receiving a refer message configured to transfer a first endpoint of a call session, the call session being between at least the first endpoint at a first communications device and a second endpoint at a second communications device, the refer message indicating to transfer the first endpoint from the first communications device to a third communications device;

subscribing the first communications device to notification messages associated with the referral of the transferred call session, the subscription to the referral extending beyond the call transfer until termination of the call;

receiving a subscribe message from the first communications device configured to refresh the subscription;

determining whether the subscription has expired, and if so whether the subscription has expired within a predetermined amount of time if the subscription has not expired or if the subscription has expired within the predetermined amount of time, refreshing the subscription;

otherwise, rejecting the refresh of the subscription; and sending, if the subscription has not expired or is refreshed through the subscription to the first communications device, a notification message indicating termination of the transferred call.

15. The computer-readable medium of claim 14, wherein the operations further comprise receiving the predetermined amount of time from a system administrator.

16. The computer-readable medium of claim 14, wherein the operations further comprise including information in the notification message indicative of whether the call was terminated normally by the second communications device during the call transfer.

17. The computer-readable medium of claim 14, wherein the operations further comprise including information received from the third communications device relating to termination of the call in the notification message, the information including at least one of a response code and a textual indication of a reason for call termination.

* * * * *